US008891997B2

(12) United States Patent
Samejima et al.

(10) Patent No.: US 8,891,997 B2
(45) Date of Patent: Nov. 18, 2014

(54) POWER SUPPLY SYSTEM FOR STOPPING AND STARTING OPERATION IN ACCORDANCE WITH INPUT VOLTAGE AND IMAGE FORMING APPARATUS INCLUDING THE SAME

(71) Applicant: Canon Kabushiki Kaisha, Tokyo (JP)

(72) Inventors: Keisuke Samejima, Suntou-gun (JP); Keizo Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/657,770

(22) Filed: Oct. 22, 2012

(65) Prior Publication Data

US 2013/0108303 A1    May 2, 2013

(30) Foreign Application Priority Data

Oct. 31, 2011 (JP) ................................ 2011-239555

(51) Int. Cl.
*G03G 15/00* (2006.01)
*H02M 3/337* (2006.01)
*H02M 1/00* (2006.01)
*H02M 3/338* (2006.01)

(52) U.S. Cl.
CPC ...... *H02M 3/337* (2013.01); *H02M 2001/0032* (2013.01); *H02M 3/3387* (2013.01); *Y02B 70/16* (2013.01); *G03B 15/80* (2013.01); *H02M 2001/0006* (2013.01)
USPC ......... 399/88; 399/37; 363/21.08; 363/21.12; 363/65

(58) Field of Classification Search
USPC ............. 399/88, 37; 363/21.04, 21.08, 21.16, 363/21.12, 65; 323/233
See application file for complete search history.

(56) References Cited

U.S. PATENT DOCUMENTS 7,272,019 B2 * 9/2007 Nakagawa ...................... 363/16
7,315,460 B2   1/2008 Kyono
(Continued)

FOREIGN PATENT DOCUMENTS

CN    102017379 A    4/2011
CN    102130594 A    7/2011
(Continued)

OTHER PUBLICATIONS

Kyono, Yoichi, Multiple Output Switching Power Supply, Dec. 18, 2008, Japanese Patent Office, Machine Translation of JP2008-306894.*

(Continued)

*Primary Examiner* — Clayton E Laballe
*Assistant Examiner* — Trevor J Bervik
(74) *Attorney, Agent, or Firm* — Fitzpatrick, Cella, Harper & Scinto

(57) ABSTRACT

A power supply apparatus determines that an input AC voltage has reached a voltage at which a power supply control IC can start operating, based on the voltage at an auxiliary winding of a transformer included in a first converter. Note that since the first converter operates so as to maintain a constant voltage at the auxiliary winding, whether the input AC voltage has fallen to an operation lower limit voltage or lower cannot be detected by only monitoring the voltage at the auxiliary winding. The power supply apparatus monitors a second voltage that is proportional to the input AC voltage is generated from the voltage being applied to the primary side of a second converter. Accordingly, the power supply control IC starts and stops operating in accordance with the input AC voltage.

9 Claims, 6 Drawing Sheets

(56) References Cited

U.S. PATENT DOCUMENTS

| | | | |
|---|---|---|---|
| 7,446,512 B2* | 11/2008 | Nishihara et al. | 323/233 |
| 8,242,873 B2 | 8/2012 | Hayasaki et al. | |
| 8,284,578 B2 | 10/2012 | Samejima | |
| 8,542,501 B2 | 9/2013 | Kyono | |
| 8,624,572 B2 | 1/2014 | Hosotani | |
| 2008/0304850 A1* | 12/2008 | Groninger et al. | 399/88 |
| 2009/0103338 A1* | 4/2009 | Nakamura | 363/89 |
| 2010/0149840 A1 | 6/2010 | Hayasaki et al. | |
| 2011/0051468 A1* | 3/2011 | Kyono | 363/21.02 |
| 2011/0148319 A1 | 6/2011 | Terazawa | |
| 2011/0293313 A1* | 12/2011 | Samejima | 399/88 |

FOREIGN PATENT DOCUMENTS

| | | |
|---|---|---|
| JP | 2007-006614 A | 1/2007 |
| JP | 2007-110803 A | 4/2007 |
| JP | 2011-244602 A | 12/2011 |

OTHER PUBLICATIONS

U.S. Appl. No. 13/599,133, filed Aug. 30, 2012, by Keizo Kojima.

Chinese Office Action dated Sep. 2, 2014 for counterpart Chinese Patent Appln No. 201210425360.7.

* cited by examiner

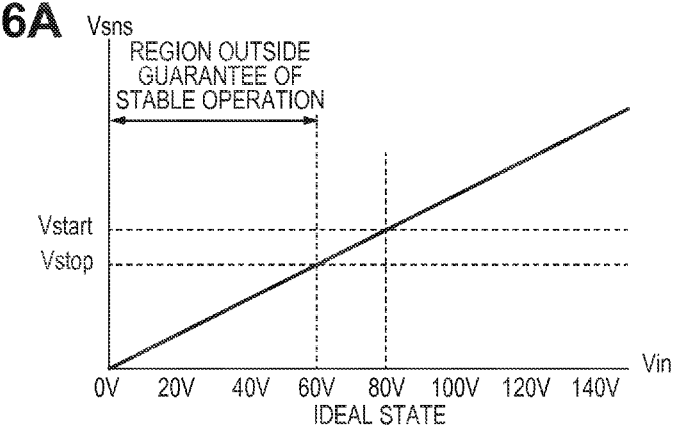
FIG. 6A — IDEAL STATE
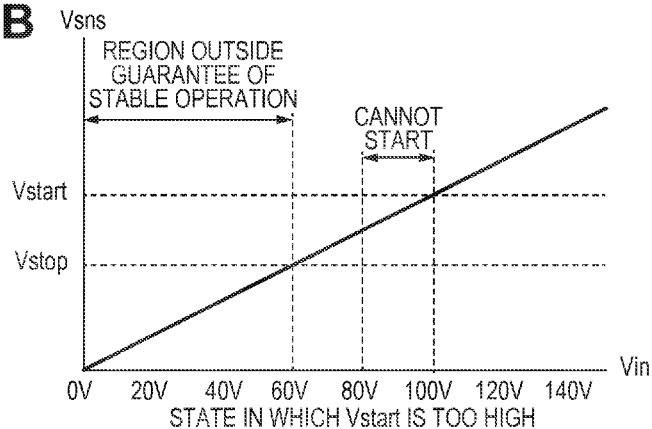
FIG. 6B — STATE IN WHICH Vstart IS TOO HIGH
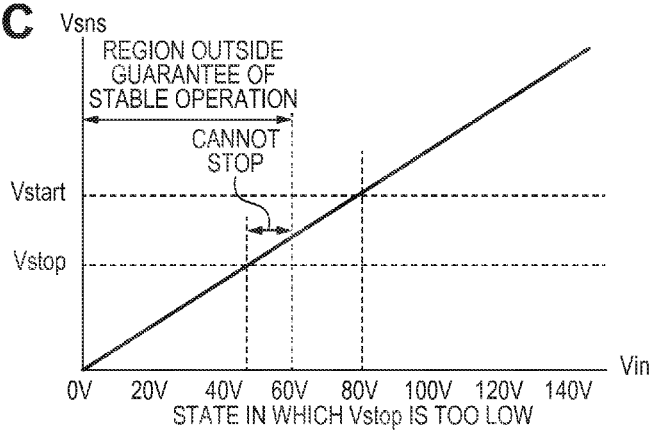
FIG. 6C — STATE IN WHICH Vstop IS TOO LOW

POWER SUPPLY SYSTEM FOR STOPPING AND STARTING OPERATION IN ACCORDANCE WITH INPUT VOLTAGE AND IMAGE FORMING APPARATUS INCLUDING THE SAME

BACKGROUND OF THE INVENTION

1. Field of the Invention

The present invention relates to a power supply apparatus and an image forming apparatus in which the operation of a control circuit is started and stopped in accordance with an input AC voltage.

2. Description of the Related Art

Power supply apparatuses that employ switching elements are widely prevalent due to having a high conversion efficiency. Japanese Patent Laid-Open No. 2007-006614 proposes a current resonance power supply in which the voltage between both ends of one switching element is detected, and another switching element is switched on when the detected voltage has risen to a predetermined voltage or higher, thus preventing a short circuit caused by resonance deviation when an electrical overload occurs.

According to Japanese Patent Laid-Open No. 2007-006614, a voltage detection circuit detects the voltage at both ends of one switching element and outputs the detected voltage to a control circuit. Generally, only a low-level voltage can be applied to the input terminal of a control circuit, therefore the voltage detection circuit needs a voltage-dividing circuit for dividing a relatively high voltage such as a commercial voltage. Since this voltage-dividing circuit consumes power even when the power supply apparatus shifts to an energy-saving operation mode (a low load mode), power consumption tends to rise.

Incidentally, a control IC controls the operation of the switching elements included in a power supply apparatus, and the control IC includes an enable terminal. The control IC starts operating when a voltage Vsns applied to the enable terminal rises to an operation start voltage Vstart or higher. However, there are cases where a decrease occurs in an input AC voltage Vin that is supplied from a commercial power supply to the power supply apparatus after the control IC has started operating. If the input AC voltage Vin falls to an operation stop voltage Vstop or lower, the current flowing to the primary side becomes excessive in an attempt to maintain the voltage on the secondary side. When the current on the primary side becomes excessive, elements become damaged and the conversion efficiency decreases. In view of this, the control IC is designed so as to stop operating when the input AC voltage Vin falls to the operation stop voltage Vstop or lower.

FIG. 6A shows the relationship between the voltage Vsns at the enable terminal of the control IC and the input AC voltage Vin in an ideal state. In this example, the control IC starts operating when the input AC voltage Vin rises to 80 V or higher, and the control IC stops operating when the input AC voltage Vin falls to 60 V or lower. The control IC starts operating when the voltage Vsns at the enable terminal rises to the operation start voltage Vstart or higher, which is proportional to the input AC voltage Vin of 80 V, and the control IC stops operating when the voltage Vsns falls to the operation stop voltage Vstop or lower, which is proportional to the input AC voltage Vin of 60 V. In this way, the operation start voltage Vstart needs to correspond to 80 V, and the operation stop voltage Vstop needs to correspond to 60 V. However, the operation start voltage Vstart and the operation stop voltage Vstop vary under various circumstances.

FIG. 6B shows the case where the operation start voltage Vstart has become too high. In this example, the operation start voltage Vstart has risen to a voltage that corresponds to the input AC voltage Vin of 100 V, and therefore the control IC cannot start even if the input AC voltage Vin has risen to 80 V or higher.

FIG. 6C shows the case where the operation stop voltage Vstop has become too low. In this example, the operation stop voltage Vstop has decreased to a voltage that corresponds to the input AC voltage Vin of 45 V, and therefore the control IC fails to stop even if the input AC voltage Vin has fallen to 60 V or lower.

SUMMARY OF THE INVENTION

In view of this, with a power supply apparatus according to the present invention, the start and the stop of operation of the control circuit is performed precisely in accordance with the input AC voltage, and power consumption is reduced.

The present invention provides a power supply apparatus comprising the following elements. A rectifying/smoothing circuit rectifies and smoothes an AC voltage that has been input, and outputs a rectified and smoothed voltage. A first converter converts the voltage output from the rectifying/smoothing circuit with a first transformer, and outputs a converted voltage. A second converter converts the voltage output from the rectifying/smoothing circuit with a second transformer, and outputs a converted voltage. The second converter may comprise the following elements. A first switching element and a second switching element are connected in series to an output end of the rectifying/smoothing circuit. A control circuit causes the first switching element and the second switching element to perform a switching operation. A first voltage generation circuit generates a first voltage that corresponds to a voltage at an auxiliary winding of the first transformer, and applies the first voltage to the control circuit. A second voltage generation circuit generates a second voltage that corresponds to the AC voltage from a voltage applied to a primary side of the second converter. The control circuit starts operating when the first voltage rises to a first threshold value or higher, and stops or limits operation of the control circuit when the second voltage falls to a second threshold value or lower, the second threshold value being lower than the first threshold value.

Further features of the present invention will become apparent from the following description of exemplary embodiments with reference to the attached drawings.

BRIEF DESCRIPTION OF THE DRAWINGS

FIGS. 6A to 6C are diagrams showing the relationship between an input AC voltage and the voltage applied to an enable terminal in a current resonance-type power supply apparatus.

DESCRIPTION OF THE EMBODIMENTS

Embodiment 1

Figure 1:
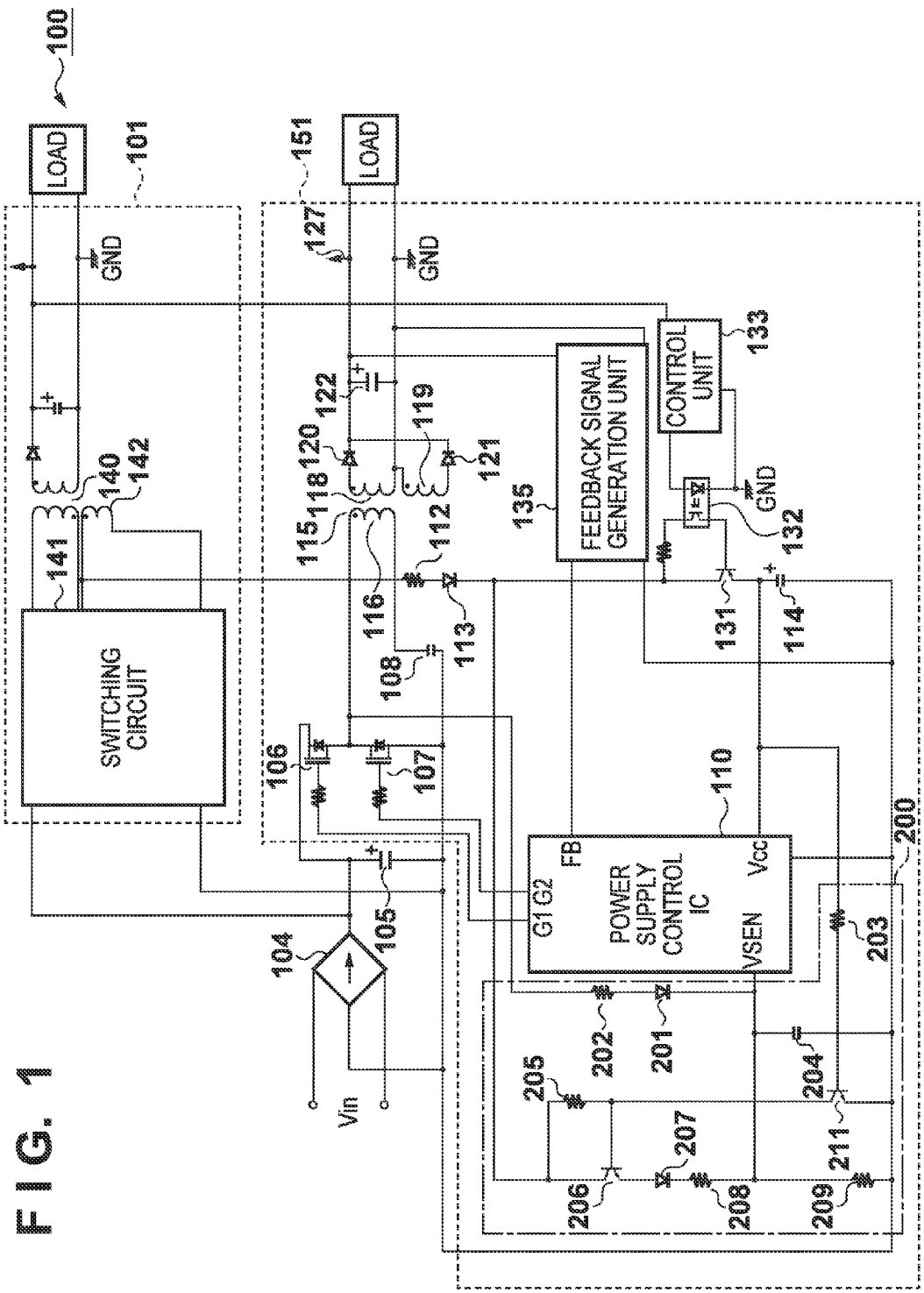
FIG. 1 is a circuit diagram of a power supply apparatus according to Embodiment 1.

FIG. 1 is a circuit diagram of a power supply apparatus of Embodiment 1. Although a general current resonance-type power supply apparatus is employed in the present embodiment, the technical idea of the present invention is applicable to flyback-type and forward-type power supply apparatuses as well.

A power supply apparatus 100 shown in FIG. 1 includes a first converter 101 and a second converter 151. The first converter 101 is a DC-DC converter that converts a DC voltage, which is obtained by an input AC voltage Vin being rectified by a rectifier diode bridge 104 and smoothed by a primary smoothing capacitor 105, into a predetermined DC voltage (e.g., 3.3 V) using a first transformer 140. The rectifier diode bridge 104 and the primary smoothing capacitor 105 function as a rectifying/smoothing circuit that rectifies and smoothes an AC voltage that has been input, and outputs the resulting voltage. The second converter 151 is a DC-DC converter that converts a DC voltage, which is obtained by the input AC voltage Vin being rectified by the rectifier diode bridge 104 and smoothed by the primary smoothing capacitor 105, into a predetermined DC voltage (e.g., 24 V) using a second transformer 115. The power supply apparatus also has an energy saving mode and a normal mode, and whereas the first converter 101 operates in both of these modes, the second converter 151 stops or limits its operation in the energy saving mode. For example, the normal mode is a mode in which an image forming apparatus performs image formation, and the energy saving mode is a standby state in which the image forming apparatus waits for a print job.

The first converter 101 executes switching operations with a switching circuit 141. The primary winding of the transformer 140 is connected to the switching circuit 141 on the downstream side thereof. A voltage output from the secondary winding of the transformer 140 is rectified and smoothed by diodes and a capacitor, and then the resulting voltage is output. Here, the transformer 140 includes an auxiliary winding 142. A proportional voltage that is proportional to the voltage applied to the primary winding of the transformer is generated at the auxiliary winding 142.

A DC voltage obtained by the input AC voltage Vin being rectified by the rectifier diode bridge 104 and smoothed by the primary smoothing capacitor 105 is applied by the second converter 151 to switching FETs 106 and 107. The current input terminal of the switching FET 106 is connected to the plus side of the primary smoothing capacitor 105, and the current output terminal is connected to the current input terminal of the switching FET 107. The current output terminal of the switching FET 107 is connected to the minus side of the primary smoothing capacitor 105. The control terminals of the switching FETs 106 and 107, which function as switching units, are connected to a power supply control IC 110. The current input terminal of the switching FET 107 is connected to one end of a primary winding 116 of a transformer 115, and the current output terminal of the switching FET 107 is connected to the other end via a current resonance capacitor 108. An AC voltage is induced at secondary windings 118 and 119 of the transformer 115. This AC voltage is rectified and smoothed by a rectifying/smoothing circuit configured by two rectifier diodes 120 and 121 and a smoothing capacitor 122, and the resulting DC voltage Vout is output to a voltage output unit 127. In this way, the switching FET 106 functions as a first switching element whose current input terminal is connected to one of the two output ends of the rectifying/smoothing circuit. Also, the switching FET 107 functions as a second switching element whose current output terminal is connected to the other one of the two output ends of the rectifying/smoothing circuit, and whose current input terminal is connected to the current output terminal of the first switching element.

A feedback signal generation unit 135 generates a feedback voltage that is proportional to the DC voltage Vout, and outputs the feedback voltage to the FB (feedback) terminal of the power supply control IC 110. The power supply control IC 110 functions as a control circuit (control unit) that causes the switching FET 106 and the switching FET 107 to perform switching operations by outputting control signals to the control terminal of the switching FET 106 and the control terminal of the switching FET 107. Specifically, the power supply control IC 110 generates and outputs control signals to the switching FETs 106 and 107 such that the DC voltage Vout matches a target voltage, in accordance with the feedback voltage. As is well-known, the power supply control IC 110 brings the DC voltage Vout close to the target voltage by controlling the on and off periods of the control signals.

Power for driving the power supply control IC 110 is supplied from the first converter 101. The voltage at the auxiliary winding 142 of the transformer 140 of the first converter 101 is rectified and smoothed by a rectifying/smoothing circuit configured by a resistor 112, a diode 113, and a capacitor 114, and the resulting voltage is applied to a Vcc terminal of the power supply control IC 110. Power for driving the power supply control IC 110 is controlled by a control unit 133. The control unit 133 operates using power supplied from the first converter 101. The control unit 133 inputs a control signal to the control terminal of a transistor 131 via a photocoupler 132. The supply of power to the power supply control IC 110 is executed and stopped by switching the transistor 131 on and off.

The operation of the power supply control IC 110 is also separately controlled by a voltage detection circuit 200. When the power supply control IC 110 attempts to start operating, the voltage detection circuit 200 applies the voltage (first voltage) at the auxiliary winding 142 of the transformer 140 of the first converter 101 to a VSEN terminal. Also, after the power supply control IC 110 has started operating, the voltage detection circuit 200 applies the median voltage (second voltage) of the switching FETs 106 and 107 to the VSEN terminal. In other words, the voltage being applied to the primary side of the second converter 151 is obtained from the connection point between the current output terminal of the switching FET 106 and the current input terminal of the switching FET 107. In this way, the VSEN terminal functions as a voltage detection terminal that receives application of a first voltage when the power supply control IC 110 is to start operating, and receives application of a second voltage when the power supply control IC 110 starts operating.

<Description of Need for Detection of Operation Stop Voltage (Low Voltage)>

Figure 2A:
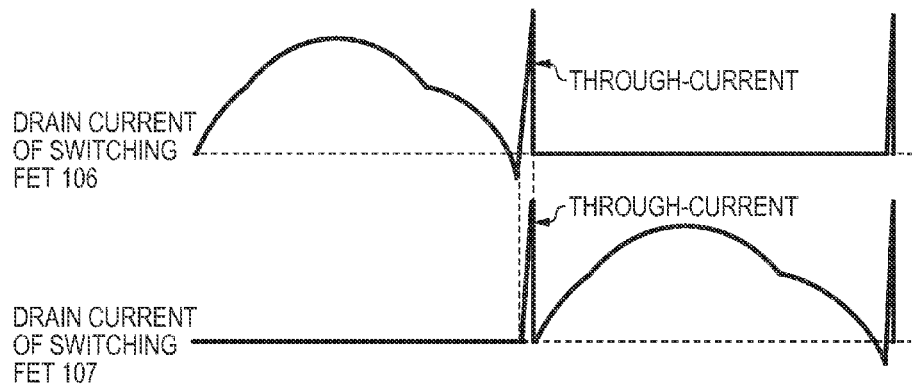
FIGS. 2A and 2B are diagrams illustrating through-current that appears in the drain current of switching FETs.

The operation stop voltage Vstop is a lower voltage than the operation start voltage Vstart. There are two features for detecting the operation stop voltage Vstop. The first feature is to protect elements such as the switching FETs 106 and 107, the transformer 115, and the current resonance capacitor 108 from an overcurrent state. The lower the input AC voltage Vin is, the higher the current on the primary side is. This is because the power supply circuit acts so as to maintain the power on the secondary side at a constant output power. However, if the input AC voltage Vin is excessively low, there is the risk of elements on the primary side entering an overcurrent state in which the rated input current of the elements is exceeded. In view of this, the first feature is to protect the elements on the primary side from the overcurrent state. The second feature is to suppress the flow of through-current to the switching FETs 106 and 107. At the same time as the switching FET 107 is switched on, a parasitic diode included in the switching FET 106 starts to undergo reverse recovery. Through-current flows due to reverse current when reverse recovery is underway. In this way, there are cases where through-current flows if the input AC voltage Vin falls below a predetermined voltage. FIG. 2A shows an example of through-current that appears in the drain current of the switching FETs 106 and 107. When this through-current is generated, the conversion efficiency of the second converter can decrease, and element breakdown can occur. Accordingly, the second feature is to suppress this through-current.

In this way, the power supply control IC 110 needs to precisely detect a decrease in the input AC voltage Vin in order to achieve the following two features.

Protect elements from the overcurrent state
Prevent the flow of through-current to switching FETs
<Operations of Voltage Detection Circuit 200>

When a voltage that is greater than or equal to an operation start threshold value, which is determined according to the operation start voltage Vstart, is applied to the VSEN terminal of the power supply control IC 110, the power supply control IC 110 starts operating, and thus the second converter 151 starts operating. However, if an abnormal low voltage is detected, the power supply control IC 110 stops operating. Specifically, the power supply control IC 110 stops or limits its own operation if the voltage at the VSEN terminal falls to an operation limit threshold value or lower, which is determined according to the operation stop voltage Vstop.

(1) Operations of Circuits Before Second Converter 151 Starts Operating

The first converter 101 generates the first voltage for causing the power supply control IC 110 to start operating at the VSEN terminal of the power supply control IC 110. First, the voltage between both ends of the auxiliary winding 142 of the transformer 140 of the first converter 101 is rectified and smoothed by the rectifying/smoothing circuit configured by the resistor 112, the diode 113, and the capacitor 114. The rectified and smoothed voltage is then applied via a transistor 206 and a diode 207 to a voltage-dividing circuit configured by a resistor 208 and a resistor 209. Note that a current-limiting resistor 205 is connected between the current input terminal and the control terminal of the transistor 206. The voltage divided by the resistor 208 and the resistor 209 is then applied to VSEN. This divided voltage is proportional to the voltage between both ends of the auxiliary winding 142. In this way, these circuits function as a first voltage generation circuit that generates a first voltage that is proportional to the voltage at the auxiliary winding of the first transformer 140 included in the first converter 101 and applies the first voltage to the power supply control IC 110. The division ratio of the resistor 208 and the resistor 209 is set such that the divided voltage matches the operation start threshold value when the input AC voltage Vin is 80 V, for example. The operation start threshold value is proportional to the operation start voltage Vstart.

The following is a more detailed description of the voltage applied to VSEN. Since the transistor 206 is connected so as to be an emitter follower, the voltage applied to the base terminal is the voltage at the auxiliary winding 142 of the transformer 140 of the first converter 101. The voltage applied to the emitter terminal is a voltage obtained by subtracting the base-emitter voltage, which is determined by the specifications of the transistor 206, from the base voltage. For example, the base-emitter voltage of the transistor 206 is approximately 0.6 V. Specifically, the voltage applied to the VSEN terminal at this time is obtained by the following equation.

$$VSEN \text{ terminal voltage} = (Ve206 - Vf207) \times R209/(R208 + R209) \quad \text{Eq. 1}$$

$$Ve206 = Vb206 - Vbe206 \quad \text{Eq. 2}$$

Ve206: emitter terminal voltage of transistor 206
Vbe206: base-emitter voltage of transistor 206
Vf207: forward voltage of diode 207
R208: resistance value of resistor 208
R209: resistance value of resistor 209

In this way, when the above-described voltage is applied to the VSEN terminal, the power supply control IC 110 can prepare for a startup operation.

Meanwhile, a drive voltage is supplied from the first converter 101 to the Vcc terminal of the power supply control IC 110. As described above, the voltage at the auxiliary winding 142 of the transformer 140 of the first converter 101 is rectified and smoothed by the rectifying/smoothing circuit configured by the resistor 112, the diode 113, and the capacitor 114. The rectified and smoothed voltage is then applied to VSEN of the power supply control IC 110 under control of the control unit 133, the photocoupler 132, and the transistor 131.

In this way, when the drive voltage is applied to the Vcc terminal of the power supply control IC, and the voltage Vsns applied to the VSEN terminal is greater than or equal to the operation start threshold value, the power supply control IC 110 starts operating. As described above, the voltage Vsns is the first voltage that is proportional to the effective value of the input AC voltage Vin.

(2) Operations of Circuits after Second Converter 151 Starts Operating

When the second converter 151 starts operating, a control signal for switching off the transistor 206 is output by the control unit 133 to the transistor 131 via the photocoupler 132. Accordingly, the state of the transistor 131 switches, and thus the state of the transistor 211 also switches (switches on). When the transistor 211 switches on, the base voltage at the transistor 206 is lowered, and therefore ultimately the transistor 206 switches off. Note that a current-limiting resistor 203 is connected to the control terminal of the transistor 211. When the transistor 206 switches off, the first voltage that had been supplied to the VSEN terminal is no longer supplied. Instead, according to the present embodiment, the drain-source voltage of the switching FET 107 is rectified and smoothed by the diode 201 and the capacitor 204 and then divided by the resistor 202 and the resistor 209, and the thus generated voltage (second voltage) is applied to the VSEN terminal. The second voltage is proportional to the effective value of the input AC voltage Vin. In other words, these circuits function as a second voltage generation circuit that generates a second voltage that is proportional to the AC voltage from the voltage applied to the primary side of the second converter 151. The second voltage generation circuit is one type of voltage generator, and is a voltage generator that can supply a voltage when the second converter 151 starts operating. In this way, a feature of the present embodiment is that the voltage generator that supplies a voltage to the VSEN terminal is switched so as to be different before and after the second converter 151 starts operating.

When the voltage applied to the VSEN terminal is switched from the first voltage to the second voltage, there are cases where the voltage at the VSEN terminal decreases. If the voltage at the VSEN terminal decreases, the power supply control IC 110 stops as mentioned above. In view of this, the capacitor 204 is connected to the VSEN terminal, and the capacitor 204 is charged by the first voltage from the first converter 101. This enables maintaining the first voltage at the VSEN terminal when the voltage applied to the VSEN terminal is switched.

(3) Method for Detecting Operation Stop Voltage Vstop when Second Converter 151 is Operating Stably While the second converter 151 is operating stably, the second voltage, which is the drain-source voltage of the switching FET 107, continues to be applied to the VSEN terminal. Here, the waveform of the drain-source voltage of the switching FET 107 is a square waveform whose peak is the plus terminal voltage of the primary smoothing capacitor 105. The period of this waveform matches the switching period of the switching FET 107.

Here, letting Vacr be the second voltage applied to the VSEN terminal, Vacr is a voltage that is roughly expressed by the following equation.

$$Vacr=((R209/(R209+R202))\times Vdch\times ON\_DUTY)/(ON\_DUTY+R/R209\times OFF\_DUTY) \quad \text{Eq. 3}$$

R209: resistance value of resistor 209
R202: resistance value of resistor 202
R: parallel combined resistance of resistor 202 and resistor 209, i.e. R=R202×R209/(R202+R209)
Vdch: plus terminal voltage of primary smoothing capacitor 105
ON_DUTY: duty cycle when switching FET 107 is in ON state
OFF_DUTY: duty cycle when switching FET 107 is in OFF state
(note that forward voltage of diode 201 is ignored)

If the diode 201 is not provided or the diode 201 short circuits, that is to say, if the circuit is configured with only the resistor 202, Vacr can be expressed by Eq. 4.

$$Vacr=((R209/(R202+R209))\times Vdch\times ON\_DUTY)/(ON\_DUTY+OFF\_DUTY) \quad \text{Eq. 4}$$

However, if the diode 201 is provided, the potential from the capacitor 204 decreases by the ratio R/R209 when the switching FET 107 is in the OFF state. In view of this, Eq. 3 is derived by multiplying OFF_DUTY of Eq. 4 by R/R209.

Here, since Vdch is proportional to the input AC voltage Vin, Vacr is also proportional to the input AC voltage Vin. In other words, detecting Vacr is synonymous with detecting the input AC voltage Vin. Also, the constants of the resistor 202, the resistor 209, and the capacitor 204 are set in advance such that when the input AC voltage Vin falls to the operation stop voltage Vstop or lower, the voltage Vacr applied to the VSEN terminal of the power supply control IC 110 falls to the operation limit threshold value or lower. Note that the operation stop voltage Vstop and the operation limit threshold value are set to lower limit voltages that enable suppressing an overcurrent state in which the rating of the primary-side elements is exceeded, and also enable suppressing through-current in the switching FETs 106 and 107.

(4) Operations after Low Voltage Detection and Effects

Figure 2B:
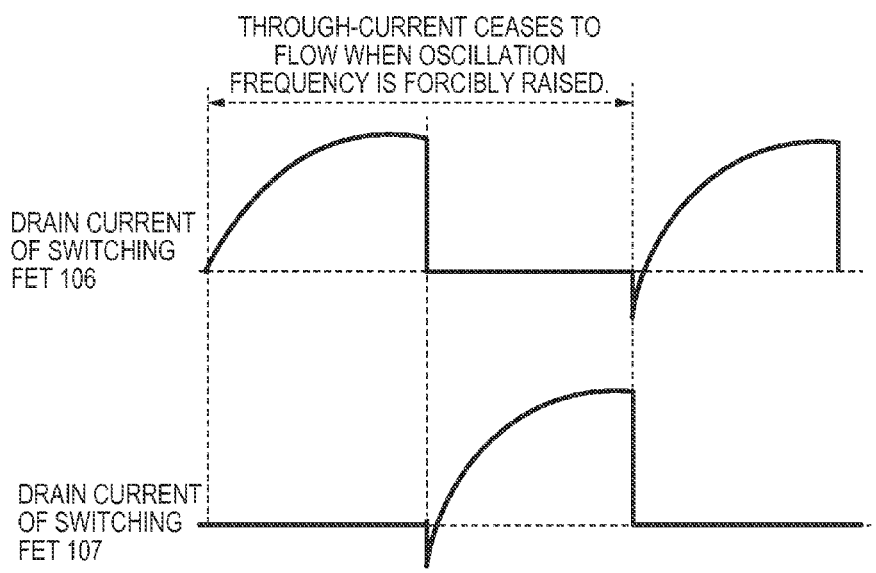

The power supply control IC 110 executes a protection operation when the voltage Vsns at the VSEN terminal falls to the operation limit threshold value or lower. For example, the power supply control IC 110 stops the oscillation operation of the switching FETs 106 and 107. This suppresses an overcurrent state in which the element rating of the primary-side elements is exceeded. This also suppresses the through-current flowing to the switching FETs 106 and 107. Alternatively, the power supply control IC 110 may raise the switching frequency so as to be higher than the current setting value. The current setting value is the switching frequency of the switching FETs 106 and 107 at the instant when the voltage Vsns at the VSEN terminal falls to the operation stop voltage Vstop or lower. As shown in FIG. 2B, through-current does not appear in the drain currents of the switching FETs 106 and 107 when the switching frequency of the switching FETs 106 and 107 is raised. Note that although the voltage of the voltage output unit 127 decreases so as to be lower than during normal operation when the switching frequency is raised, it is possible to suppress through-current and the overcurrent state in which the rating of the primary-side elements is exceeded. In this way, the power supply control IC 110 may suppress through-current by limiting its own operation through raising the switching frequency. Note that "during normal operation" refers to the period in which the voltage Vsns at the VSEN terminal exceeds the operation limit threshold value (when the input AC voltage Vin exceeds 60 V).

By supplying the voltages for detecting the operation start voltage Vstart and the operation stop voltage Vstop from different power supplies in this way, it is possible to suppress the overcurrent state and through-current by stably starting up and stopping the operation of the second converter 151. Conventionally, the voltage between both ends of two switching elements was divided by a voltage-dividing circuit and detected, and thus the power consumption of the voltage-dividing circuit was high, which was a hindrance to energy saving. However, the present embodiment has an advantage in terms of power consumption since the voltage at the auxiliary winding 142 of the transformer of the first converter 101 is detected. Note that since the switching circuit 141 of the first converter 101 operates so as to keep the voltage at the auxiliary winding 142 constant, a decrease in the input AC voltage Vin is not reflected in the voltage at the auxiliary winding 142. In other words, it is not possible to determine whether the input AC voltage Vin has fallen to the operation stop voltage Vstop or lower by merely monitoring the voltage at the auxiliary winding 142. In view of this, with the present embodiment, by monitoring the median voltage of the switching FETs 106 and 107, it can be detected whether the input AC voltage Vin has fallen to the operation stop voltage Vstop or lower, while suppressing power consumption compared to conventional technology in which the voltage between both ends is monitored.

Embodiment 2

Figure 3:
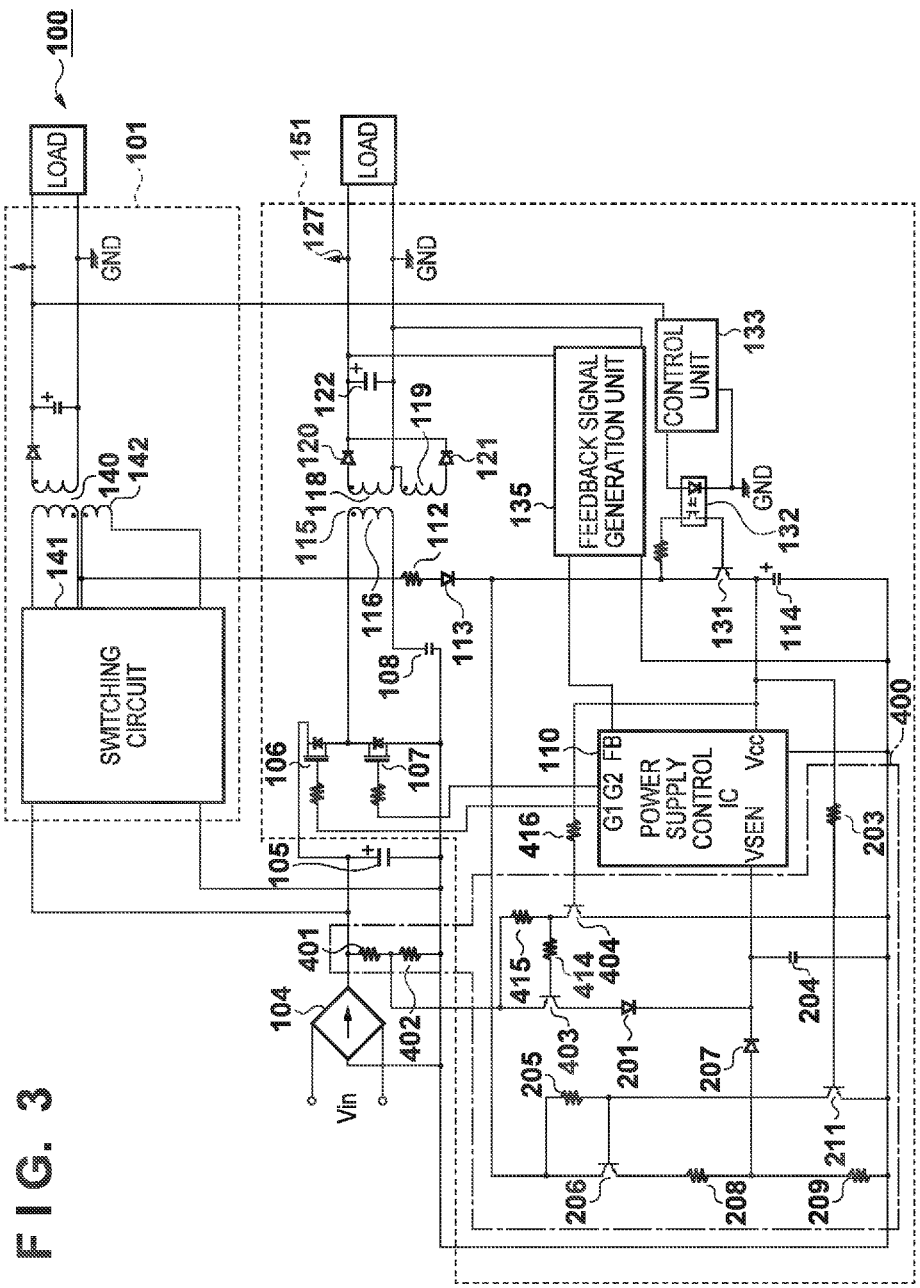
FIG. 3 is a circuit diagram of a power supply apparatus according to Embodiment 2.

FIG. 3 is a circuit diagram of a power supply apparatus of Embodiment 2. Embodiment 2 differs from Embodiment 1 with respect to the configuration of a voltage detection circuit 400 that detects the operation start voltage and the operation stop voltage. Note that portions in FIG. 3 that are the same as those in FIG. 1 have been given the same reference signs in order to simplify the description.

The voltage detection circuit 400 can be roughly divided into an operation start voltage supply circuit for applying the first voltage, which is proportional to the operation start voltage Vstart, to the VSEN terminal, and an operation stop voltage (low voltage) supply circuit for applying the second voltage, which is proportional to the operation stop voltage Vstop, to the VSEN terminal. The configuration of the operation start voltage supply circuit is unchanged, with the exception of a change in the position of the diode 207. On the other hand, the point at which the first voltage is obtained is changed in the operation stop voltage supply circuit. In other words, with Embodiment 1, the drain-source voltage of the switching FET 107 is applied to the VSEN terminal of the power supply control IC 110 when the second converter 151 is operating stably. In contrast, with Embodiment 2, the voltage at the plus terminal of the primary smoothing capacitor 105 is divided by a resistor 401 and a resistor 402, and the resulting voltage (second voltage) is applied to the VSEN terminal via a transistor 403 and the diode 201. In this way, the voltage between both ends of the primary smoothing capacitor 105 of the rectifying/smoothing circuit is obtained as the voltage applied to the primary side of the second converter 151.

One end of the resistor 401 is connected to the plus terminal of the primary smoothing capacitor 105, and the other end is connected to one end of the resistor 402 and the current input terminal of the transistor 403. The other end of the resistor 402 is connected to the minus terminal of the primary smoothing capacitor 105. One end of a resistor 415 is connected to the current input terminal of the transistor 403. The current output terminal of the transistor 403 is connected to the anode terminal of the diode 201. One end of a resistor 414 is connected to the control terminal of the transistor 403. The other end of the resistor 414 is connected to the current input terminal of the transistor 404 and the other end of the resistor 415. The Vcc terminal of the power supply control IC 110 is connected to the control terminal of the transistor 404 via a resistor 416.

(i) Operations of Circuits Before Second Converter 151 Operates

These operations will not be described here since they are the same as those described in Embodiment 1.

(ii) Operations of Circuits Immediately after Second Converter 151 Starts Operating Next, when the second converter 151 starts operating, the transistor 206 switches off as described above. Accordingly, the first voltage that had been supplied from the first converter 101 to the VSEN terminal is no longer supplied. Instead, in Embodiment 2, the second voltage obtained by dividing the voltage at the plus terminal of the primary smoothing capacitor 105 is supplied to the VSEN terminal. Note that since the capacitor 204 is connected to the VSEN terminal in Embodiment 2 as well, a decrease in the voltage during switching is suppressed.

(iii) Detection of Operation Stop Voltage Vstop when Second Converter 151 is Operating Stably If the second converter 151 is operating stably, a voltage that is proportional to the voltage at the plus terminal of the primary smoothing capacitor 105 is supplied to the VSEN terminal of the power supply control IC 110 as described above. Also, the constants of the resistor 401, the resistor 402, and the capacitor 204 are set such that when the input AC voltage Vin has reached the operation stop voltage Vstop (e.g., 60 V), the voltage applied to the VSEN terminal is less than or equal to the operation limit threshold value Vlow.

$$Vlow < Vdch*(R402/(R401+R402))-Vf201 \quad \text{Eq. 5}$$

$$Vdch = Vstop \times \sqrt{2} \quad \text{Eq. 6}$$

R401: resistance value of resistor 401
R402: resistance value of resistor 402
Vf201: forward voltage Vf of diode 201
Vdch: plus terminal voltage of primary smoothing capacitor 105
Vstop: operation stop voltage (e.g., 60 V) determined according to input AC voltage Vin The operation stop voltage Vstop is determined in advance through experimentation or simulation so as to be able to suppress the overcurrent state in which the rating of the primary-side elements is exceeded, and be able to suppress through-current in the switching FETs 106 and 107.

(iv) Operations after Low Voltage Detection and Effects

The operations performed after low voltage detection in Embodiment 2 will not be described since they are similar to those in Embodiment 1. Also, similar effects are exhibited by the circuits of Embodiment 2 that are the same as those in Embodiment 1. When the position at which the operation start voltage Vstart is obtained and the position at which the operation stop voltage Vstop is obtained are different positions in this way, it is possible to stably start up the second converter 151, and stably stop the second converter 151 when the input AC voltage Vin has decreased. Also, the application of the first voltage and the second voltage stops upon transitioning to the power saving mode, which is advantageous over conventional technology in terms of power consumption.

Embodiment 3

Figure 4:
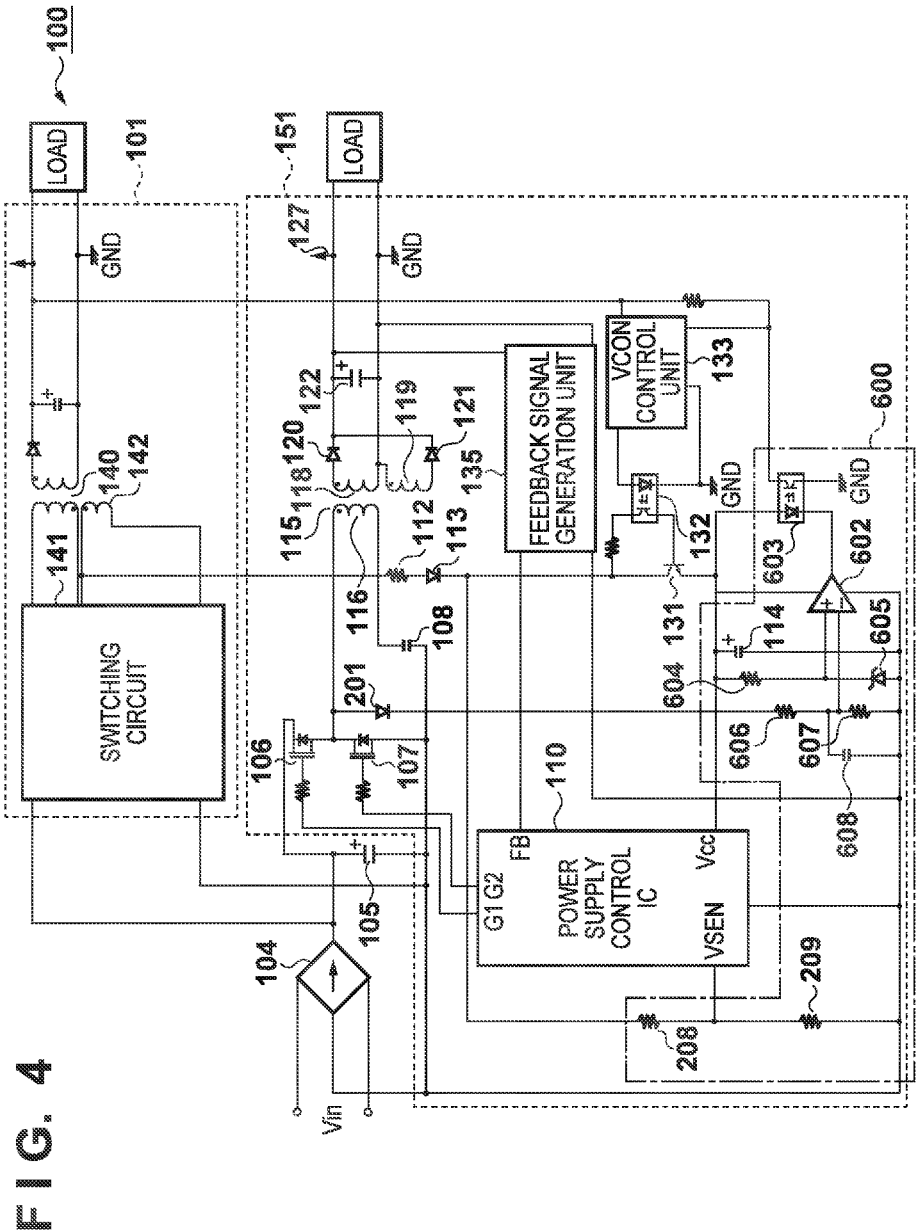
FIG. 4 is a circuit diagram of a power supply apparatus according to Embodiment 3.

FIG. 4 is a circuit diagram of a power supply apparatus of Embodiment 3. In Embodiments 1 and 2, the first voltage indicating the operation start voltage Vstart and the second voltage indicating the operation stop voltage Vstop are detected at one voltage detection terminal, whereas a feature of Embodiment 3 is that the operation start voltage Vstart is detected at the VSEN terminal, and the operation stop voltage Vstop is detected by a voltage detection circuit 600. The voltage detection circuit 600 functions so as to cut off the supply of power to the Vcc terminal of the power supply control IC if the input AC voltage Vin falls to the operation stop voltage Vstop (e.g., 60 V). Note that in Embodiment 3 as well, portions that have already been described have been given the same reference signs in order to simplify the description.

In FIG. 4, the anode terminal of the diode 201 is connected to a point between the switching FETs 106 and 107. The cathode terminal is connected to one end of a resistor 606. The other end of the resistor 606 is connected to one end of a capacitor 608, one end of a resistor 607, and the minus input terminal of a comparator 602. The plus input terminal of the comparator 602 is connected to the Vcc terminal of the power supply control IC 110 via a resistor 604. Also, the plus input terminal of the comparator 602 is connected to the cathode terminal of a zener diode 605. The output terminal of the comparator 602 is connected to the light emitting element of a photocoupler 603. The light receiving element of the photocoupler 603 is connected to the control unit 133. In other words, the comparator 602 detects that the input AC voltage Vin has fallen to the operation stop voltage Vstop or lower, and the detection result is transmitted to the control unit 133 via the photocoupler 603. When the control unit 133 recognizes that the input AC voltage Vin has fallen to the operation stop voltage Vstop or lower, the control unit 133 switches off the transistor 131 via the photocoupler 132 so as to cut off the supply of power to the Vcc terminal of the power supply control IC.

(i) Operations of Circuits Before Second Converter 151 Starts Operating

The voltage at the auxiliary winding 142 of the transformer 140 of the first converter 101 is rectified and smoothed by the rectifying/smoothing circuit configured by the resistor 112, the diode 113, and the capacitor 114. The rectified and smoothed voltage is then divided by the resistor 208 and the resistor 209 so as to generate the first voltage, which is applied to the VSEN terminal of the power supply control IC 110. The first voltage that is applied is proportional to the voltage at the auxiliary winding 142. The power supply control IC 110 starts operating when the first voltage rises to the operation start threshold value or higher. Note that the supply of power to the Vcc terminal of the power supply control IC is the same as that which has already been described.

(ii) Operations of Circuits Immediately after Second Converter 151 Starts Operating Even after the second converter 151 has started operating, a voltage is applied to the VSEN terminal from the first converter 101.

(iii) Method for Detecting Operation Stop Voltage when Second Converter 151 is Operating Stably According to FIG. 4, a reference voltage that corresponds to the operation limit threshold value is created by the resistor 604 and the zener diode 605. This reference voltage is input to the plus terminal of the comparator 602. On the other hand, the second voltage, which is proportional to the drain-source voltage of the switching FET 107 is input to the minus terminal of the comparator 602. Note that the second voltage is generated by the drain-source voltage of the switching FET 107 being rectified by the diode 201 and smoothed by the capacitor 608, and the resulting voltage being divided by the resistor 606 and the resistor 607. In this way, the comparator 602 functions as a comparison unit that compares the second voltage and the operation limit threshold value.

The constants of the resistor 604, the zener diode 605, the resistor 606, and the resistor 607 are selected such that the relation "plus terminal voltage of comparator 602 < minus terminal voltage of comparator 602" is satisfied when operation is to start, and the relation "plus terminal voltage of comparator 602 > minus terminal voltage of comparator 602" after operation starts.

Letting Vcon(−) be the minus terminal voltage of the comparator 602, Vcon(−) is a voltage that is roughly expressed by the following equation, similarly to Eq. 3 in Embodiment 1.

$$V\text{con}(-) = ((R607/(R607+R606)) \times V\text{dch} \times \text{ON\_DUTY}/(\text{ON\_DUTY} + R/R607 \times \text{OFF\_DUTY}) \quad \text{Eq. 7}$$

R607: resistance value of resistor 607
R606: resistance value of resistor 606
R: parallel combined resistance of resistor 606 and resistor 607, i.e. R=R606×R607/(R606+R607)
Vdch: plus terminal voltage of primary smoothing capacitor 105
ON_DUTY: duty cycle when switching FET 107 is in ON state
OFF_DUTY: duty cycle when switching FET 107 is in OFF state
(note that forward voltage of diode 201 is ignored)

Also, letting Vcon(+) be the plus terminal voltage of the comparator 602, the following equation holds true.

$$V\text{con}(+) = Vz \quad \text{Eq. 8}$$

Vz: zener voltage of zener diode 605

(iv) Operations of Circuits after Detection of Operation Stop Voltage and Effects When the input AC voltage Vin decreases, the voltage between both ends of the primary smoothing capacitor 105 also decreases. When the input AC voltage Vin falls to the operation stop voltage Vstop or lower, the second voltage falls to the operation limit voltage or lower, and therefore the comparison result of the comparator 602 flips from Low to Hi. The comparison result is input to the VCON terminal of the control unit 133 via the photocoupler 603. When the control unit 133 recognizes that the comparison result changed to Hi, the control unit 133 switches off the transistor 131 via the photocoupler 132. Accordingly, the supply of drive power to the power supply control IC 110 stops. In this way, the control unit 133, the photocoupler 132, the transistor 131, and the voltage detection circuit 600 function as a cut-off circuit that supplies drive power to the control circuit from the first converter if the second voltage exceeds the operation limit threshold value, and cuts off the supply of drive power to the power supply control IC 110 from the first converter 101 if the second voltage has fallen to the operation limit threshold value or lower.

The comparison result Hi is input to the VCON terminal of the control unit 133 also before the second converter 151 starts up. However, it is assumed that the control unit 133 is programmed so as to ignore the comparison result Hi when it is input before start up.

According to Embodiment 3, whereas the power supply control IC is started up using the VSEN terminal, the power supply control IC can be stably stopped by detecting the operation stop voltage Vstop with the voltage detection circuit 600. Accordingly, the oscillation operation of the switching FETs 106 and 107 is stopped, thus suppressing an overcurrent state in which the rating of the primary-side elements is exceeded, and suppressing through-current as well.

Other Embodiments

Although Embodiments 1 to 3 apply the example of a current resonance-type power supply apparatus for the sake of convenience, the present invention is applicable to other types as well, such as flyback-type and forward-type power supply apparatuses. This is because with these types as well, the lower the input AC voltage Vin is, the higher the current on the primary side is, and thus there is the possibility of the overcurrent state and the like occurring.

Also, the above-described power supply apparatus 100 can supply power to various electronic apparatuses. Furthermore, two or more second converters may be provided. In this case, the second converters may function as DC-DC converters that supply mutually different voltages.

Figure 5A:
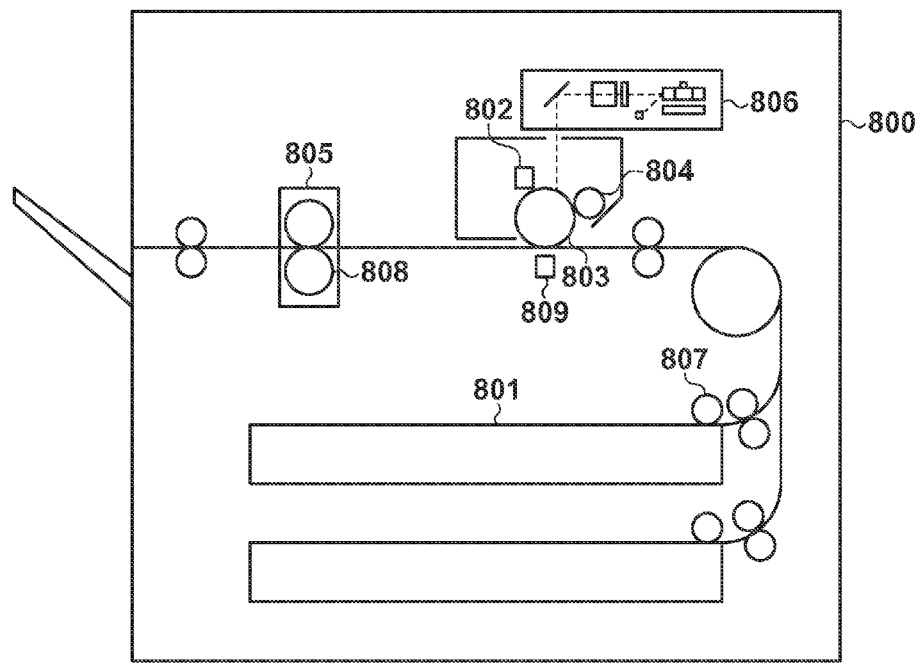
FIG. 5A is a schematic cross-sectional diagram of an image forming apparatus.
Figure 5B:
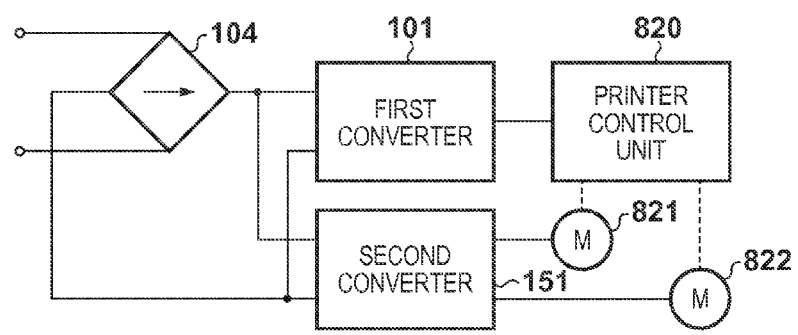
FIG. 5B is a diagram showing a power supply apparatus and an electrical system.

The following describes an image forming apparatus as one example of an electronic apparatus with reference to FIGS. 5A and 5B. An image forming apparatus 800 is an electrophotographic-type image forming apparatus. Sheets stored in a paper feeding cassette 801 are fed to a transport path by a pickup roller 807. A photosensitive drum 803, which is an image carrier, is charged with a uniform potential by a charger 802. An exposure apparatus 806 outputs a light beam that corresponds to image data so as to form a latent image on the surface of the photosensitive drum 803. A developing roller 804 forms a toner image by developing the latent image using toner. A transfer apparatus 809 transfers the toner image from the photosensitive drum 803 to a sheet. A fixing apparatus 805 applies pressure and heat to the toner image with fixing rollers 808 so as to fix the toner image onto the sheet. In this way, an image forming unit includes the photosensitive drum 803, the exposure apparatus 806 that forms a latent image by exposing the photosensitive drum 803 to light, the developing apparatus (developing roller 804) that forms a toner image by developing the latent image using toner, the transfer apparatus 809 that transfers the toner image from the photosensitive drum 803 to a sheet, and the fixing apparatus 805 that fixes the toner image to the sheet.

In FIG. 5B, the first converter 101 supplies a DC voltage of 3.3 V to a printer control unit 820. The second converter 151 generates a DC voltage of 24 V and supplies it to motors 821 and 822. The motor 821 is a motor that drives the photosensitive drum 803, for example. The motor 822 is a motor that drives the fixing rollers 808. The motors 821 and 822 function as drive units for driving the image forming unit.

Note that third and fourth converters for generating DC voltages of 5 V and 12 V may be added. In this case, the internal configurations of the third and fourth converters may be basically similar to the internal configuration of the second converter 151. Note that 5 V is the voltage that is supplied to an electromagnetic clutch (solenoid) that drives a flapper for switching the sheet transport path, for example.

By applying the power supply apparatus 100 of the present invention to the image forming apparatus 800 in this way, the image forming apparatus 800 operates stably. If the image forming apparatus 800 operates stably, it is possible to maintain the quality of images formed on sheets. Also, since the probability of successful image formation rises, the present invention will contribute to the saving of consumables and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-239555, filed Oct. 31, 2011, which is hereby incorporated by reference herein in its entirety.

What is claimed is:

1. A power supply apparatus comprising:
a rectifying/smoothing circuit that rectifies and smoothes an AC voltage that has been input, and outputs a rectified and smoothed voltage;
a first converter that converts the voltage output from the rectifying/smoothing circuit with a first transformer, and outputs a converted voltage; and
a second converter that converts the voltage output from the rectifying/smoothing circuit with a second transformer, and outputs a converted voltage;
wherein the second converter comprises:
a first switching element and a second switching element that are connected in series to an output end of the rectifying/smoothing circuit;
a control circuit that causes the first switching element and the second switching element to perform a switching operation;
a first voltage generation circuit that generates a first voltage that corresponds to a voltage at an auxiliary winding located at a primary side of the first transformer, and applies the first voltage to the control circuit; and
a second voltage generation circuit that generates a second voltage that corresponds to the AC voltage from a voltage applied to a primary side of the second converter, and
the control circuit is further configured to start the switching operation when the first voltage that corresponds to the voltage at the auxiliary winding located at the primary side of the first transformer rises to a first threshold value or higher, and to stop or to limit the switching operation when the second voltage that corresponds to the AC voltage falls to a second threshold value or lower, the second threshold value being lower than the first threshold value,
wherein a current input terminal of the first switching element is connected to one of two output ends of the rectifying/smoothing circuit, and a current output terminal of the second switching element is connected to the other one of the two output ends of the rectifying/smoothing circuit, and the second voltage generation circuit obtains the voltage being applied to the primary side of the second converter from a connection point between a current output terminal of the first switching element and a current input terminal of the second switching element.

2. The power supply apparatus according to claim 1,
wherein the control circuit comprises a voltage detection terminal to which the first voltage is applied when the control circuit is to start operating, and to which the second voltage is applied when the control circuit starts operating, and
the control circuit starts operating when the first voltage applied to the voltage detection terminal rises to the first threshold value or higher, and limits operation of the control circuit when the second voltage applied to the voltage detection terminal falls to the second threshold value or lower.

3. The power supply apparatus according to claim 2, wherein the voltage detection terminal is connected to a capacitor that maintains the first voltage being applied to the voltage detection terminal when the voltage applied to the voltage detection terminal is switched from the first voltage to the second voltage.

4. The power supply apparatus according to claim 1, wherein when the second voltage falls to the second threshold value or lower, the control circuit stops operating or increases the switching frequency of the first switching element and the second switching element.

5. The power supply apparatus according to claim 1,
wherein the control circuit comprises a voltage detection terminal to which the first voltage is applied when the control circuit is to start operating,
the control circuit starts operating when the first voltage applied to the voltage detection terminal rises to the first threshold value or higher, and
the second converter comprises:
a comparator that compares the second voltage and the second threshold value; and
a cut-off circuit that supplies drive power from the first converter to the control circuit if the second voltage exceeds the second threshold value, and cuts off supply of the drive power from the first converter to the control circuit when the second voltage falls to the second threshold value or lower.

6. The power supply apparatus according to claim 1, wherein the second voltage generation circuit obtains the voltage being applied to the primary side of the second converter from a voltage between both ends of a smoothing capacitor of the rectifying/smoothing circuit.

7. The power supply apparatus according to claim 1, wherein if the control circuit stops operating, the switching operation of the first switching element and the second switching element is stopped.

8. An image forming apparatus comprising:
an image forming unit;
a drive unit for driving the image forming unit; and
a power supply apparatus that supplies power to the drive unit,
wherein the power supply apparatus comprises:
a rectifying/smoothing circuit that rectifies and smoothes an AC voltage that has been input, and outputs a rectified and smoothed voltage; and
a first converter that converts the voltage output from the rectifying/smoothing circuit with a first transformer, and outputs a converted voltage, and a second converter that converts the voltage output from the rectifying/smoothing circuit with a second transformer, and outputs a converted voltage, the second converter comprises:

a first switching element and a second switching element that are connected in series to an output end of the rectifying/smoothing circuit;

a control circuit that causes the first switching element and the second switching element to perform a switching operation;

a first voltage generation circuit that generates a first voltage that corresponds to a voltage at an auxiliary winding located at a primary side of the first transformer, and applies the first voltage to the control circuit; and a second voltage generation circuit that generates a second voltage that corresponds to the AC voltage from a voltage applied to a primary side of the second converter, and the control circuit is further configured to start the switching operation when the first voltage that corresponds to the voltage at the auxiliary winding located at the primary side of the first transformer rises to a first threshold value or higher, and to stop or to limit the switching operation when the second voltage that corresponds to the AC voltage falls to a second threshold value or lower, the second threshold value being lower than the first threshold value, wherein a current input terminal of the first switching element is connected to one of two output ends of the rectifying/smoothing circuit, and a current output terminal of the second switching element is connected to the other one of the two output ends of the rectifying/smoothing circuit, and the second voltage generation circuit obtains the voltage being applied to the primary side of the second converter from a connection point between a current output terminal of the first switching element and a current input terminal of the second switching element.

9. The image forming apparatus according to claim 8, wherein the image forming unit comprises:

an image carrier;

an exposure apparatus that forms a latent image by exposing the image carrier to light;

a developing apparatus that forms a toner image by developing the latent image using toner;

a transfer apparatus that transfers the toner image from the image carrier to a sheet; and a fixing apparatus that fixes the toner image to the sheet, wherein the drive unit is a motor that drives one of the image carrier and the fixing apparatus.

* * * * *